United States Patent
Claussen et al.

(10) Patent No.: US 9,707,947 B2
(45) Date of Patent: Jul. 18, 2017

(54) HYDRAULIC BRAKE SYSTEM BRAKING METHOD AND BRAKING DEVICE

(75) Inventors: Heiko Claussen, Hannover (DE);
Jurgen Eickhoff, Walsrode (DE);
Volker Heinrich, Nordstemmen (DE);
Ralph-Carsten Lulfing, Garbsen (DE);
Wolfgang Strache, Hemmingen (DE)

(73) Assignee: WABCO GMBH, Hannover (DE)

( * ) Notice: Subject to any disclaimer, the term of this patent is extended or adjusted under 35 U.S.C. 154(b) by 0 days.

(21) Appl. No.: 14/349,489

(22) PCT Filed: Jul. 19, 2012

(86) PCT No.: PCT/EP2012/003055
§ 371 (c)(1),
(2), (4) Date: Apr. 3, 2014

(87) PCT Pub. No.: WO2013/060396
PCT Pub. Date: May 2, 2013

(65) Prior Publication Data
US 2014/0232178 A1    Aug. 21, 2014

(30) Foreign Application Priority Data

Oct. 25, 2011 (DE) .................. 10 2011 116 902

(51) Int. Cl.
*B60T 7/12* (2006.01)
*B60T 13/58* (2006.01)
(Continued)

(52) U.S. Cl.
CPC .............. *B60T 13/58* (2013.01); *B60T 7/042* (2013.01); *B60T 7/12* (2013.01); *B60T 8/328* (2013.01);
(Continued)

(58) Field of Classification Search
CPC . B60T 7/12; B60T 8/40; B60T 8/4013; B60T 8/86; B60T 8/4054; B60T 8/4072;
(Continued)

(56) References Cited

U.S. PATENT DOCUMENTS 4,119,353 A    10/1978 Bihlmaier
4,133,343 A *   1/1979 Carroll ................... B60T 13/16
                                                       137/116.5

(Continued)

FOREIGN PATENT DOCUMENTS

DE    26 22 534    12/1977
DE    27 02 819     7/1978
(Continued)

*Primary Examiner* — Nicholas J Lane
(74) *Attorney, Agent, or Firm* — Leydig, Voit & Mayer, Ltd (57) ABSTRACT

A braking device for a vehicle comprises a main brake cylinder, which provides, in response to the actuation thereof, an operating brake pressure in at least one operating brake circuit for the actuation of an operating brake. A hydraulic fluid pressure intake is connected to a hydraulic circuit, which contains a hydraulic fluid having a built-up hydraulic circuit pressure. Through the hydraulic fluid pressure intake, the hydraulic fluid is provided at the hydraulic circuit pressure. The braking device further comprises a valve device, which actively controls a main brake cylinder actuation pressure and/or a parking brake release pressure by means of the hydraulic fluid that is provided. The main brake cylinder is actuated by means of the main brake cylinder actuation pressure for an active brake engagement. Alternatively or additionally, a parking brake is hydraulically released by means of the parking brake release pressure.

16 Claims, 4 Drawing Sheets

(51) Int. Cl.
*B60T 8/40* (2006.01)
*B60T 8/32* (2006.01)
*B60T 8/48* (2006.01)
*B60T 13/16* (2006.01)
*B60T 7/04* (2006.01)

(52) U.S. Cl.
CPC .............. *B60T 8/3275* (2013.01); *B60T 8/40* (2013.01); *B60T 8/4845* (2013.01); *B60T 13/165* (2013.01); *B60T 13/168* (2013.01)

(58) Field of Classification Search
CPC .......... B60T 8/4077; B60T 8/44; B60T 8/441; B60T 8/442; B60T 13/142; B60T 13/143; B60T 13/144; B60T 13/163; B60T 8/328
See application file for complete search history.

(56) References Cited

U.S. PATENT DOCUMENTS

| | | | |
|---|---|---|---|
| 4,286,826 A | 9/1981 | Leiber | |
| 4,825,989 A * | 5/1989 | Frigger | B60T 8/17616 180/197 |
| 5,169,215 A * | 12/1992 | Takata | 303/113.4 |
| 6,179,389 B1 * | 1/2001 | Freitag et al. | 303/2 |
| 2002/0017820 A1 * | 2/2002 | Nishii | B60T 8/3275 303/114.1 |
| 2006/0284478 A1 * | 12/2006 | Binev | 303/15 |
| 2011/0025119 A1 * | 2/2011 | Nishino et al. | 303/3 |

FOREIGN PATENT DOCUMENTS

| | | |
|---|---|---|
| DE | 40 12 958 A1 | 10/1991 |
| DE | 43 16 339 A1 | 11/1994 |
| DE | 195 16 639 A1 | 11/1996 |
| DE | 198 17 190 C1 | 7/1999 |
| DE | 101 14 843 | 10/2001 |
| DE | 10 2010 038 328 A1 | 2/2011 |
| DE | 10 2010 012 886 A1 | 9/2011 |
| EP | 0 962 369 A2 | 12/1999 |
| GB | 2 267 543 A | 12/1993 |
| WO | WO 92/17357 | 10/1992 |
| WO | WO 97/14590 | 4/1997 |

\* cited by examiner

HYDRAULIC BRAKE SYSTEM BRAKING METHOD AND BRAKING DEVICE

FIELD OF THE INVENTION

The invention generally relates to a braking device and method for braking a vehicle, as well as a hydraulic brake system with a hydraulically actuatable service brake.

BACKGROUND OF THE INVENTION

Hydraulic brake systems have a master brake cylinder which, in response to the actuation of a brake pedal, converts brake pedal pressure into hydraulic pressure, which is provided by means of brake fluid.

In a first known brake system, the hydraulic pressure in the master brake cylinder is provided directly to two service brake circuits. The pressure is transmitted by an intermediate service brake modulator to the service brake of the vehicle equipped with the brake system. The service brake modulator has several solenoid valves and return pumps for an antilock function. Furthermore, the service brake modulator can have additional solenoid valves which, in conjunction with the return pumps, allow an active braking pressure build-up. In general, at least four solenoid valves and two pressure vessels are required for this, together with a corresponding design of the return pumps in the service brake modulator, which is complex and expensive.

It is known that vehicles carry at least one hydraulic circuit, which has hydraulic fluid with hydraulic circuit pressure. A power steering system, for example, can be operated by means of the hydraulic fluid with the hydraulic circuit pressure.

In a second known brake system, the service brake circuit is not supplied with brake fluid by the master brake cylinder. The brake pressure provided by the master brake cylinder serves merely to actuate relay valves, by means of which the provision of brake pressure into the service brake circuits is controlled. The pressure in the service brake circuits is built up in a technically complex and costly manner by means of hydraulic pumps. An active brake pressure build-up in the service brake circuits is also possible by means of solenoid valves.

SUMMARY OF THE INVENTION

Generally speaking, it is an object of the present invention to provide an improved braking method and an improved braking device and brake system.

In accordance with an embodiment of the present invention, the braking device comprises the master brake cylinder, which, in response to its actuation, generates a service brake pressure in at least one service brake circuit and provides this to actuate a service brake. Furthermore, the braking device has a hydraulic fluid pressure input via which hydraulic fluid is provided with a hydraulic circuit pressure. The hydraulic fluid pressure input is connected to a hydraulic circuit, which conducts the hydraulic fluid with the built-up hydraulic pressure.

The braking device furthermore has a valve device, which provides active output control of a master brake cylinder actuation pressure and/or a parking brake release pressure by means of the hydraulic fluid provided with the hydraulic circuit pressure via the hydraulic fluid pressure input. The master brake cylinder is hydraulically actuated by means of the master brake cylinder actuation pressure for active braking intervention. Alternatively or additionally, the parking brake is hydraulically released by means of the parking brake release pressure.

Thus, it will be appreciated that the present invention allows an active brake pressure build up or active braking intervention or actuation of the parking brake without the disadvantages described above of the prior art. The output control of the master brake cylinder actuation pressure or the parking brake release pressure does not take place in a device connected downstream of the master brake cylinder or in a brake circuit or other circuit carrying brake fluid, but upstream of the master brake cylinder, wherein the necessary pressure is provided from the hydraulic circuit, i.e., the hydraulic circuit pressure.

The master brake cylinder can thus be actuated not only manually, mechanically by means of the brake pedal, but also, for active braking intervention, hydraulically, with a pressure provided from the hydraulic circuit by means of the hydraulic circuit pressure.

The parking brake is actuated not with the brake fluid of a brake circuit, but directly with the hydraulic fluid of the hydraulic circuit, in particular, by means of a hydraulic, oil. The hydraulic fluid flows into a cylinder of the parking brake to release this against the spring three.

Preferably, the hydraulic circuit pressure in the hydraulic circuit is built up by means of a power steering pump. The hydraulic circuit in this case is also designed to supply steering assistance, in particular, a hydraulic power steering. Therefore, no additional pump is required to build up the master brake cylinder actuation pressure or parking brake release pressure. The power steering pump is preferably driven directly by the internal combustion engine of the vehicle equipped with the brake system. Alternatively, the power steering pump is driven electrically.

According to an embodiment of the present invention, the braking method has an activation function that activates the active output control of the master brake cylinder actuation pressure in response to a determined driving state. This driving state is a driving state for which the necessity of an active braking intervention has been determined. For example, an electronic stability control or roll control or emergency brake assistant determines the necessity of an active braking intervention. The braking interventions are distributed to the individual brakes or wheels of the vehicle by means of the service brake modulator, which can reduce the brake pressure for individual brakes or wheels in relation to the brake pressure controlled by means of the master brake cylinder. The braking device has electronics, which perform the activation function.

According to another embodiment, the braking device has deactivation electronics to perform a deactivation function. The deactivation function deactivates the active output control of the master brake cylinder actuation pressure in response to a brake pedal actuation three sensed by a force sensor. In particular, when the brake pedal actuation force is above a limit value, the active output control of the master brake cylinder actuation pressure is deactivated. Thus, the superimposed active braking intervention is deactivated.

According to a further embodiment, the braking device has a brake servo, which amplifies a master brake cylinder actuation force applied to actuate the master cylinder, by means of the hydraulic fluid provided via the hydraulic fluid pressure input with the hydraulic circuit pressure. The hydraulic fluid from the hydraulic pressure circuit, which is used to actuate the master brake cylinder or to actuate the parking brake, is thus also used for the brake force amplification, which preferably takes place in the region of the master brake cylinder. In particular, the master brake cylinder is actuated by the brake pedal via the brake servo. An active braking intervention takes place with the support of the brake servo. For the active braking intervention, therefore, a pressure for direct actuation of the service brake need not be provided by means of powerful, large and costly pumps.

Preferably, the master brake cylinder and the brake servo are integrated in a common unit, in particular, in a servo unit called a booster, and/or in a servo actuation device. The booster or servo actuation device also comprises the hydraulic fluid pressure input. Preferably, the servo actuation device also comprises the valve device or parts of the valve device. Alternatively or additionally, the valve device or parts of the valve device are arranged outside the servo actuation device. In particular, according to one embodiment of the invention, the output control of the parking brake release pressure can also take place outside the servo actuation device.

According to another embodiment, the valve device has a parking brake valve. The parking brake valve can preferably assume two switch positions between which it can change. In a first or powered switch position, the parking brake valve releases the parking brake by means of the hydraulic fluid with the parking brake actuation pressure. The parking brake preferably has at least one spring accumulator brake cylinder. By pressing the hydraulic fluid into a chamber of the spring accumulator brake cylinder, the parking brake is released against the force of the spring. In the second or unpowered switch position, the parking brake valve applies the parking brake by means of the return of hydraulic fluid. Thus, only one solenoid valve is required, but no additional pump and no additional brake circuit carrying brake fluid, to apply or release the parking brake.

According to a further embodiment, the braking device has wake-up electronics, which, in response to a sensed brake actuation, switches a control device or parts of the control device controlling the service brake and/or the parking brake from its rest state into its operating state. The brake actuation is preferably sensed by means of an electromechanical switch, wherein an electrical switch signal is generated that switches on the wake-up electronics, in particular wakes up a processor. According to an alternative embodiment, the wake-up electronics can also be constantly on standby and carry out the wake-up by means of a software function.

According to yet another embodiment, part of the control device is woken up that responsible for controlling or triggering the hydraulic circuit. In particular, a wake-up of the control device or parts of the control device by means of the wake-up electronics causes the pump, in particular, the power steering pump, to start, which builds up the pressure in the hydraulic circuit, when this pump is operated electrically according to this particular embodiment. Furthermore, preferably, in response to the wake-up of the control device or parts of the control device, the valve device is triggered by means of the wake-up electronics such that the master brake cylinder actuation pressure or parking brake release pressure can be controlled.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is explained in greater detail below using exemplary embodiments and with reference to the accompanying figures, in which.

LIST OF REFERENCE CHARACTERS 1 and 1' Brake system
2 and 2' Braking device
4 Brake pedal
6 and 6' Servo actuation device
8 Service brake modulator
10 Service brake
12 First brake cylinder
14 Second brake cylinder
16 Third brake cylinder
18 Fourth brake cylinder
20 Control device
22 First service brake circuit
24 Second service brake circuit
26 Master brake cylinder
28 Storage tank
30 First booster output
32 First connecting channel
34 First service brake modulator input
36 Second booster output
38 Second connecting channel
40 Second service brake modulator input
42 First inlet valve
44 Second inlet valve
46 Third inlet valve
48 Fourth inlet valve
50 First service brake modulator output
52 Second service brake modulator output
54 Third service brake modulator output
56 Fourth service brake modulator output
58 First rotation speed sensor
60 Second rotation speed sensor
62 Third rotation speed sensor
64 Fourth rotation speed sensor
66 First outlet valve
68 Second outlet valve
70 Third outlet valve
72 Fourth outlet valve
74 First return line
75 First return tank
76 First return pump
78 Second return line
79 Second return tank 80 Second return pump
82 Pump motor
88 Brake servo
90 Hydraulic circuit
92 Power steering pump
94 Power steering unit
96 Hydraulic fluid pressure input
98 Actuating valve
99 Force sensor
100 Activator
101 Deactivator
102 and 102' Valve device
104 First output control valve
106 Pressure-limiting valve
108 Sensor/pressure switch
110 Sensor/first electromechanical switch
112 Sensor/second electromechanical switch
114 Wake-up electronics
116 Parking brake module
118 Second output control valve
120 Parking brake valve
122 Pressure accumulator
124 Choke
126 Non-return valve
128 Pressure sensor
130 Parking brake
132 Flow-limiting valve
134 First control input
136 Second control input
138 Pre-control valve
140 Braking method
142 Start of method
144 Query: ignition activated?
146 End of method
148 Master brake cylinder generates and provides service brake pressure
150 Provision of hydraulic fluid with the hydraulic circuit pressure
152 Brake servo amplifies master brake cylinder actuation force
154 Driving state determined
156 Query: does driving state require active braking intervention?
158 Sample force sensor
160 Query: does brake pedal actuation force lie above limit value?
162 Activator activates active output control of master brake cylinder actuation pressure
164 Deactivator deactivates active output control of master brake cylinder actuation pressure
166 Valve device provides active output control of master brake cylinder actuation pressure
168 Actuation of master brake cylinder
170 Actuation of parking brake
172 Query: release parking brake?
174 Parking brake valve assumes a first switch position
176 Release of parking brake
178 Query: apply parking brake?
180 Parking brake valve assumes second switch position
182 Parking brake applied
200 Active increase of output brake pressure
202 Method steps
204 Start
206 Query: ignition operated?
208 End of method
210 Query from wake-up electronics: brake pedal actuated?
212 Query: rest state?
214 Query: rest state?
216 Switch to operating state
218 Start pressure build-up in hydraulic circuit
220 Switch to rest state

DETAILED DESCRIPTION OF THE PREFERRED EMBODIMENTS

Figure 1:
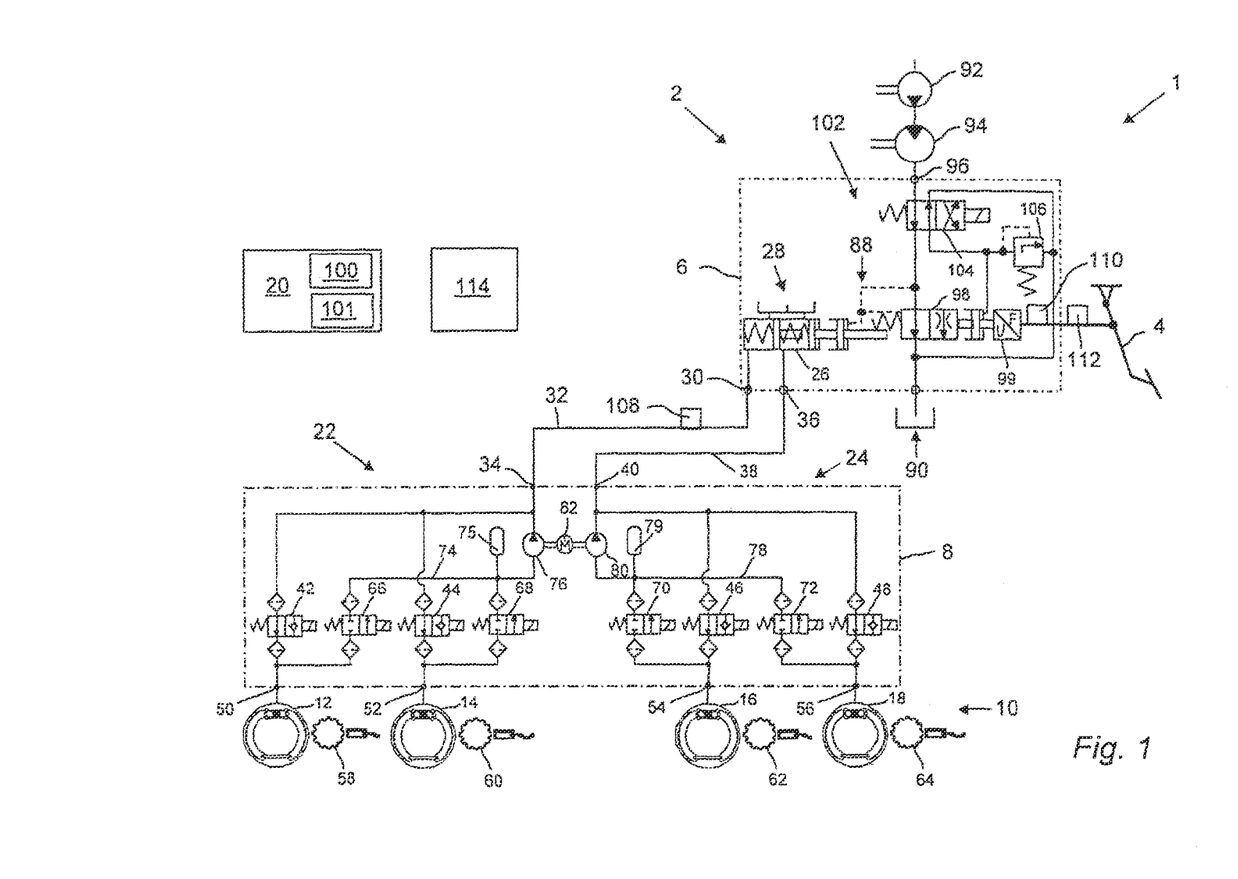
FIG. 1 depicts a brake system with a braking device according to a first exemplary embodiment of the present invention.

FIG. 1 shows a brake system 1 with a braking device 2 according to an exemplary embodiment of the invention. The brake system has a brake pedal 4, a servo actuation device 6 and a service brake modulator 8 with the functionality of an antilock system or hydro assembly. The brake system 1 also has a service brake 10 with a first brake cylinder 12, a second brake cylinder 14, a third brake cylinder 16 and a fourth brake cylinder 18, and a control device 20. The first brake cylinder 12 and the second brake cylinder 14 are activated via a first service brake circuit 22. The third brake cylinder 16 and the fourth brake cylinder 18 are activated via a second service brake circuit 24. The service brake circuits 22 and 24 are hydraulic, brake circuits in which brake fluid is used as a pressure-transmitting medium. The brake circuits 22 and 24 are supplied by a dual-action master brake cylinder 26, known as a tandem master cylinder, with hydraulic fluid from the storage reservoir 28 or an expansion tank. The master brake cylinder 26 can be part of a booster.

In response to actuation of the brake pedal 4, the master brake cylinder 26 is actuated so that brake fluid is pressed into the service brake circuits 22 and 24. In particular, the first service brake pressure, output for the first service brake circuit 22, is provided via a first booster output 30, a first connecting channel 32 and a first service brake modulator input 34, to the service brake modulator 8. Furthermore, a second service brake pressure, ideally output in a similar fashion, is provided by the master brake cylinder 26 via a second booster output 36, a second connecting channel 38 and a second service brake modulator input 40, to the service brake modulator 8. The first and second booster outputs 30, 36 are also the first and second outputs of the servo actuating device 6.

The service brake modulator 8 has a first inlet valve 42, a second inlet valve 44, a third inlet valve 46 and a fourth inlet valve 48, which are each formed as 3/2-way solenoid valves and, in the unpowered state, assume an open position by means of the spring force. The first service brake modulator input 34 is connected to a first service brake modulator output 50 or second service brake modulator output 52, to which the first brake cylinder 12 or second brake cylinder 14 are connected, by the unpowered first inlet valve 42 or second inlet valve 44, respectively. Similar to the first service brake circuit 22, in the second service brake circuit 24, the second service brake modulator input 40 is connected by the unpowered third inlet valve 46 or fourth inlet valve 48 to a third service brake modulator output 54 and fourth service brake modulator output 56, respectively, to which the third brake cylinder 16 and fourth brake cylinder 18 are connected.

Arranged on the brake cylinders 12, 14, 16 and 18 are a first rotation speed sensor 58, a second rotation speed sensor 60, a third rotation speed sensor 62 and a fourth rotation speed sensor 64. The rotation speed sensors 58 to 64 detect the rotation speeds of the wheels, with which the brake cylinders 12 to 18 are associated and which can be braked by means of the brake cylinders. Sensor data is transmitted by the rotation speed sensors 58 to 64, via electrical lines (not shown), to the control device 20 or another control device. The control device 20 or other control device detects a locking or locking tendency of a wheel, and, in response to a detected locking tendency, controls the service brake modulator 8 to release the respective brake cylinder 12, 14, 16 or 18. For example, in the case of a detected locking tendency of a wheel associated with the first brake cylinder 12, the first inlet valve 42 is powered so that it assumes its powered position against the force of its spring, in which position the flow of brake fluid through the first inlet valve 42 to the first service brake modulator output 50 is prevented.

In the powered state, the first inlet valve 42, the second inlet valve 44, the third inlet valve 46 and the fourth inlet valve 48 each have the function of a non-return valve. The back-flow of brake fluid from the first service brake modulator output 50 through the first inlet valve 42 to the first service brake modulator input 34 would consequently be possible if for example, the brake pedal 4 were no longer actuated.

The service brake modulator 8 has a first outlet valve 66 formed as a 3/2-way solenoid valve, a second outlet valve 68, a third outlet valve 70 and a fourth outlet valve 72. In the unpowered state, the outlet valves 66, 68, 70 and 72 each assume a blocking position by means of the spring force, whereas in the powered state, these outlet valves 66, 68, 70 and 72 assume an open position against the spring force and connect the first service brake modulator output 50 or second service brake modulator output 52, respectively, through the powered first outlet valve 66 or second outlet valve 68 and through a first return line 74, to a first return tank 75 and to the input of a first return pump 76 of the service brake modulator 8. Correspondingly, the powered third outlet valve 70 or fourth outlet valve 72 connects the third service brake modulator output 54 or fourth service brake modulator output 56, respectively, through a second return line 78, to a second return tank 79 and to the input of a second return pump 80. The first return pump 76 and the second return pump 80 are driven by a common pump motor 82. The first return tank 75 or second return tank 79 acts as a reservoir for the back-flowing brake fluid.

The servo actuation device 6 has a brake servo 88, which hydraulically amplifies the force exerted by means of the brake pedal 4 on the master brake cylinder 26 or on a piston rod of the master brake cylinder 26. The brake servo 88 is operated via a hydraulic circuit 90, which does not carry brake fluid but hydraulic fluid, and is pressurized with a hydraulic circuit pressure by means of a power steering pump 92. Furthermore, a power steering unit 94 is connected to the hydraulic circuit 90 and is also operated by means of the power steering pump 92 or hydraulic circuit 90. The hydraulic fluid with the hydraulic circuit pressure is provided to the braking device 2 or servo actuation device 6 through a hydraulic fluid pressure input 96 of the braking device 2 or servo actuation device 6.

The braking device 2 or servo actuation device 6 furthermore has an actuating valve 98, which is actuatable both mechanically and hydraulically and is as a 2/2-way valve. The actuating valve 98 is connected between the brake pedal 4 and the brake servo 88 or master brake cylinder 26. The brake can therefore be actuated not only mechanically by means of the brake pedal 4 but also hydraulically. In this case, the brake force amplification is switched by means of the brake servo 88, so that the actuating valve 98 can be actuated with comparatively low hydraulic pressures, and the pressure provided by the power steering pump 92 is sufficient for this.

The servo actuation device 6 can be a structural unit, in particular with a common housing, or alternatively, it can comprise several discrete components for example the master brake cylinder 26, the brake servo 88 and the valves 98, 104 and 106. The master brake cylinder 26, the brake servo 88 and the actuating valve 98 can be combined in the so-called booster or, together, form the booster.

Behind the brake pedal 4, a force sensor 99 is arranged in the servo actuation device 6 or, where applicable, in the booster, to sense a brake pedal actuation force. By means of the force sensor 99, data or signals sensed are transmitted via electrical lines (not shown) to the control device 20 or another control device, where they are analyzed and used to determine whether the driver has expressed a desire to brake. To activate the active braking intervention, the control device 20 executes an activation function and, for this, has an activator 100. The activator 100, and hence the activation function, are preferably provided by the control device 20. The activator 100 comprises control functions adapted to maintain or restore or favorably influence the driving stability of a vehicle equipped with the brake system 1. In particular, the activation function activates the active braking intervention in response to a detected deviation of a measured yaw rate from a calculated rate, or in response to a detected slip of one or more wheels of the vehicle. The activation function prevents, for example, the undesirable slip of the wheels or a loss of driving stability. Deactivation takes place by means of a deactivation function or deactivator 101 of the control device 20, in particular, in response to a detected brake pedal actuation.

The master brake cylinder actuation pressure is controlled by means of the hydraulic circuit pressure and by means of a valve device 102 of the braking device 2. To this extent, the description of the first exemplary embodiment in FIG. 1 also applies to the second exemplary embodiment in FIG. 2 (with the same reference numerals or corresponding ones with an apostrophe).

In the first exemplary embodiment according to FIG. 1, the valve device 102 has a first output control device 104 formed as a 4/2-way solenoid valve. In the powered state, the first output control device 104 connects the hydraulic fluid pressure input 96 to the control input of the actuating valve 98. Any excess pressure is automatically reduced by a pressure-limiting valve 106.

Figure 2:
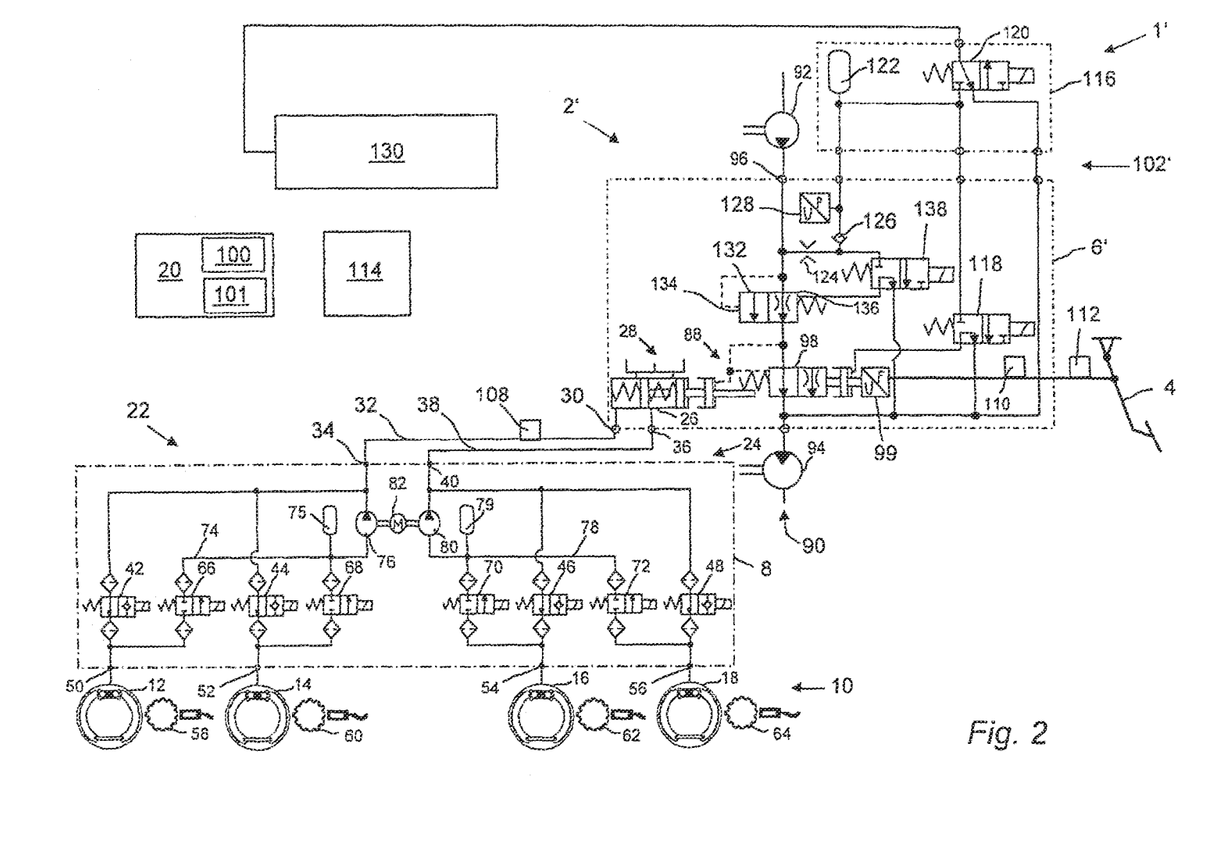
FIG. 2 depicts a brake system with a braking device according to a second exemplary embodiment of the invention.

Furthermore, in FIG. 1, as in FIG. 2, sensors 108, 110 and 112 are shown, which all have the purpose of sensing an actuation of the brake pedal 4 directly or indirectly, and switching on, by means of a switching pulse, wake-up electronics 114, in particular, one not permanently consuming electrical power or transferring corresponding sensor data to the wake-up electronics 114. In response to the switching on or in response to a sensed brake activation, the wake-up electronics 114 switches the control device 20 or parts of the control device 20 or another control device from its rest state to its operating state, in particular, if this respective control device is already in a rest state if the vehicle ignition is switched off. To wake up the control device, only one of the sensors 99, 100, 108, 110, 112 need be provided and supply a switch pulse. The wake-up electronics 114 preferably does not consume electrical power until it receives a switch pulse or until an electronic contact is closed by brake pedal actuation. According to an alternative embodiment, the control device samples one or more of the sensors 108, 110, 112 and/or the force sensor 99, and determines, from the sensor data or sensor signals from one or more sensors 108, 110, 112 and/or data or signals from the force sensor 99, whether a wake-up takes place.

The sensor 108 is a pressure switch, which is connected to the first service brake circuit 22 and switches in response to reaching a certain minimum pressure in the first connecting channel 32. Sensors 110 and 112 are a first electromechanical switch and a second electromechanical switch, which are actuated mechanically by means of the brake pedal 4, wherein the servo actuation device 6 comprises the first electromechanical switch, while the second electromechanical switch 112 is arranged outside the servo actuation device 6. As an alternative to the first electromechanical switch 110 or second electromechanical switch 112 a first or second distance sensor can be provided.

FIG. 2 shows a brake system 1' with a braking device 2' according to a second exemplary embodiment of the invention. The brake system 1' corresponds in large part to the brake System 1 of the first exemplary embodiment according to FIG. 1. In particular, the same reference numerals designate the same or at least similar parts or those with the equivalent function.

The braking device 2' has a valve device 102' arranged partly inside a housing of a servo actuation device 6' and partly inside a separate housing of a parking brake module 116. In particular, the servo actuation device 6' has a second output control device 118, which is formed as a 3/2-way solenoid valve and can be switched electromagnetically against the force of a spring. Furthermore, the valve device 102' in the parking brake module 116 has a parking brake valve 120 that can be actuated electromagnetically against the force of a spring and is formed as a 3/2-way solenoid valve. A pressure accumulator 122 is also arranged in the parking brake module 116. As an alternative to the embodiment example shown, the parking brake module 116 can also be integrated in the servo actuation device 6'.

The braking device 2' or servo actuation device 6' has a choke 124 and a non-return valve 126, via which the pressure accumulator 122 can be filled with the hydraulic fluid provided at the hydraulic fluid pressure input 96. The pressure built up in the pressure accumulator 122 is sensed by means of a pressure sensor 128 arranged in the servo actuation device 6'. The pressure accumulator 122 allows a rapid conduction of hydraulic fluid through the parking brake valve 120, which is in its first or powered switch position, to a parking brake 130. The parking brake 130 has, for example, several spring accumulator brake cylinders, wherein the hydraulic fluid conducted to the parking brake valve 120 releases the spring accumulator brake cylinder against the force of its spring and, hence, releases the parking brake 130. In the unpowered state of the parking brake valve 120, however, or in its second switch position, hydraulic fluid from the parking brake 130 flows back through the parking brake valve 120 so that the parking brake 130 is applied by means of the spring forces of the spring accumulator brake cylinder. The parking brake valve 120 thus controls a parking brake release pressure, which is provided to the parking brake 130, by means of the hydraulic fluid from the hydraulic circuit 90.

The second output control valve 118, however, controls the master brake cylinder actuation pressure. The second output control valve 118 is connected via a first connection with the control input of the actuating valve 98. In the unpowered state of the second control valve 118, the pressure of the control input of the actuating valve 98 is dissipated through the second output control valve 118. In the powered state of the second output control valve 118, however, the control input of the actuating valve 98 is connected through the second output control valve 118 to the pressure accumulator 122 and, hence, to a pressure source, so that the actuating valve 98 can be actively actuated for an active braking intervention.

The servo actuation device 6' furthermore comprises a flow-limiting valve 132, which is formed as a 2/2-way valve and can be controlled by means of the force of the spring and hydraulically via a first control input 134 and a second control input 136. The first control input 134 is connected to the hydraulic fluid pressure input 96, wherein the pressure present at the first control input 134 counters the force of the spring. The second control input 136 is, however, pre-controlled by a pre-control valve 138. The pressure present at the control input 136 cooperates with the spring force of the flow-limiting valve 132. Against the three of this spring, the flow-limiting valve 132 assumes its open position in which it connects the input of the actuating valve 98 to the hydraulic fluid pressure input 96. This connection is choked by the force of the spring.

The pre-control valve 138, like the second output control valve 118, is formed as a 3/2-way solenoid valve, which, in the unpowered state, by means of the force of its spring, causes a pressure dissipation at the second control input 136 of the flow-limiting valve 132. In the powered state, however, the second control input 136 is connected by the pre-control valve 138 and choke 124 to the hydraulic fluid pressure input 96, such that the outflow of hydraulic fluid from the hydraulic fluid press re input 96 to the actuating valve 98 is choked and the pressure in the pressure accumulator 122 increases. Valves 132 and 138 and the choke 124 serve as a pressure balancer for a charge pressure control of the pressure accumulator 122.

Figure 3:
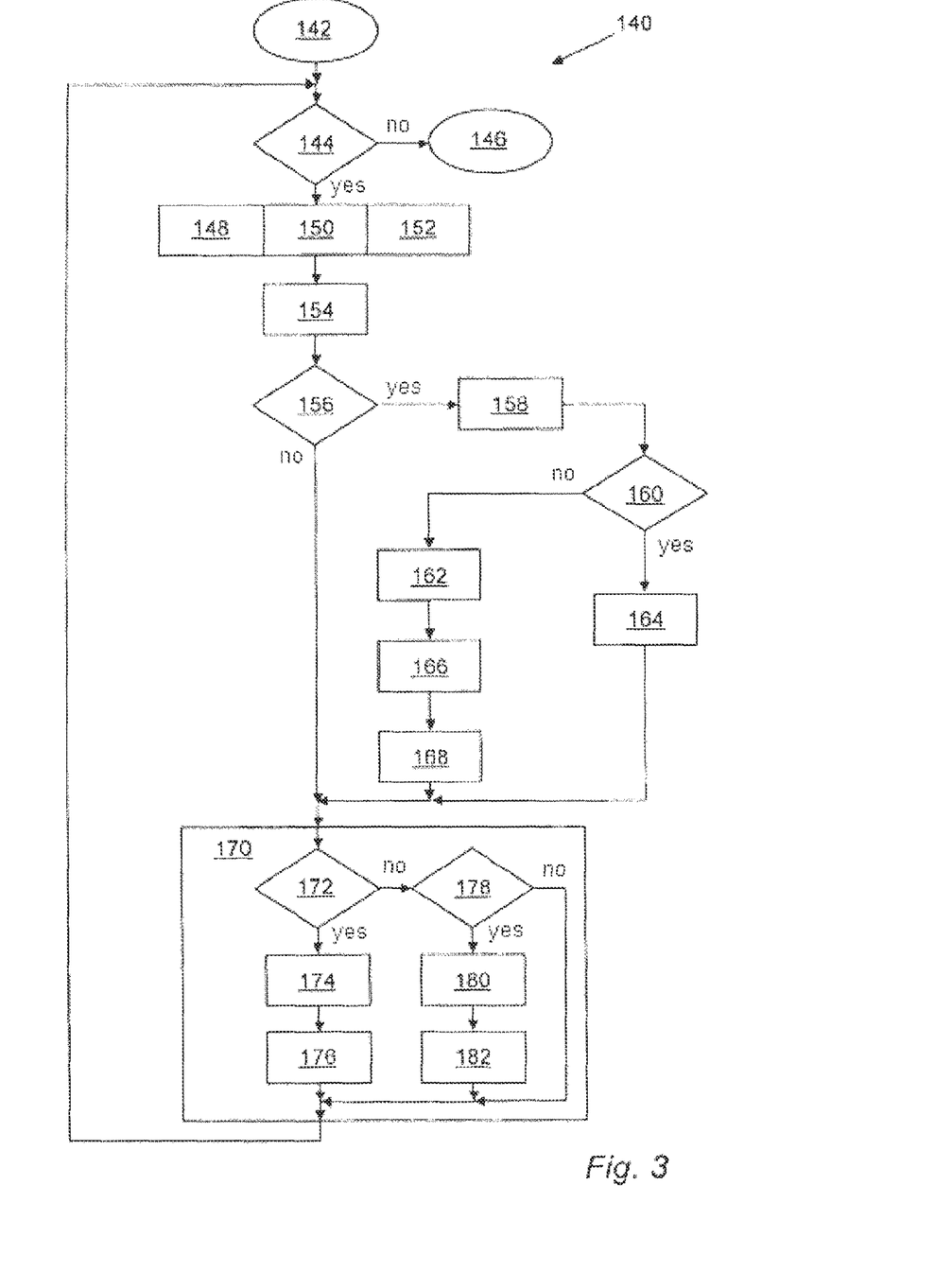
FIG. 3 is a block diagram illustrating a braking method according to an exemplary embodiment of the present invention.

FIG. 3 is a simplified block diagram illustrating a braking method 140 according to an exemplary embodiment of the present invention. The braking method 140 is carried out, for example, by means of the braking device 2 or brake system 1 of the first exemplary embodiment in FIG. 1 or with the braking device 2' or brake system 1' according to the second exemplary embodiment according to FIG. 2.

The braking method 140 starts at a step 142 where it is assumed that, in a vehicle equipped with the brake system 1 or 1', the ignition is switched on or activated. Therefore, a query 144 establishes whether the ignition is switched on. If this is not the case, the method, as depicted, ends at step 146. Otherwise, the steps 148, 150 and 152 follow. According to step 148, in response to its actuation, the master brake cylinder 26 generates a service brake pressure in service brake circuits 22 and 24 and provides this service brake pressure to actuate the service brake 10. According to step 150, via the hydraulic fluid pressure input 96, hydraulic fluid is provided with the hydraulic circuit pressure. According to step 152, the brake servo 88 amplifies a master brake cylinder actuation force, applied to actuate the master brake cylinder 26, by means of the hydraulic fluid provided with hydraulic circuit pressure via the hydraulic fluid pressure input 96.

According to step 154, driving states of the vehicle are determined. In particular, to determine the driving states, information already present such as the speed of the vehicle, and rotation speed information from rotation speed sensors 58, 60, 62 and 64, and data or measurement values from acceleration sensors such as for detecting transverse acceleration, or yaw rate sensors for detecting a yaw rate, are detected and analyzed. From this information, it is determined whether a driving state is present that requires an active braking intervention. If an active braking intervention does not appear necessary, apart from the method steps concerning the parking brake, the method continues with step 144 so that the service brake 10 can still be operated according to steps 148, 150 and 152. If, however, according to query 156, the driving state determined appears to necessitate an active braking intervention, the force sensor 99 is sampled according to step 158. According to a query 160, the control device 20 then queries or determines, by means of data from the force sensor 99, whether the actuation force sensed at the force sensor 99 lies above a certain limit value. Only if this is not the case does the activation function or the activator 100, provided by means of the control device 20, activate the active output control of the master brake cylinder actuation pressure and, hence, an active braking intervention. In other cases, the deactivation function or deactivator 101, according to step 164, prevents the active output control of the master brake cylinder actuation pressure.

On active braking intervention, step 162 is followed by step 166, according to which the valve device 102 or 102' provides active output control of the master brake cylinder actuation pressure, and step 168 according to which the master brake cylinder 26 is hydraulically actuated for an active braking intervention by means of the master brake cylinder actuation pressure. The method steps that concern the service brake 10 are followed by further process steps that concern the parking brake 130, but, preferably, these can take place simultaneously. In particular, the query 156 or step 164 or 168 is followed by active operation of the parking brake 130 according to step 170, wherein a parking brake pressure is increased or reduced or maintained. In relation to the brake system 1 or braking device 2 of the first embodiment according to FIG. 1, step 170 is omitted.

Step 170 comprises a query 172 as to whether the parking brake should be released or the parking brake release pressure increased. If this is the case, step 174 follows according to which the parking brake valve 120 assumes its powered switch position, so that the parking brake 130 is released according to step 176. If, according to query 172, the parking brake 130 is not to be released, according to a query 178 it is established whether the parking brake 130 should be applied or whether the parking brake release pressure should be lowered. If this is not the case, the method leaves step 170. In other cases, the parking brake valve 120, according to step 180, changes to its unpowered switch position so that the parking brake 130 is engaged according to step 182.

Figure 4:
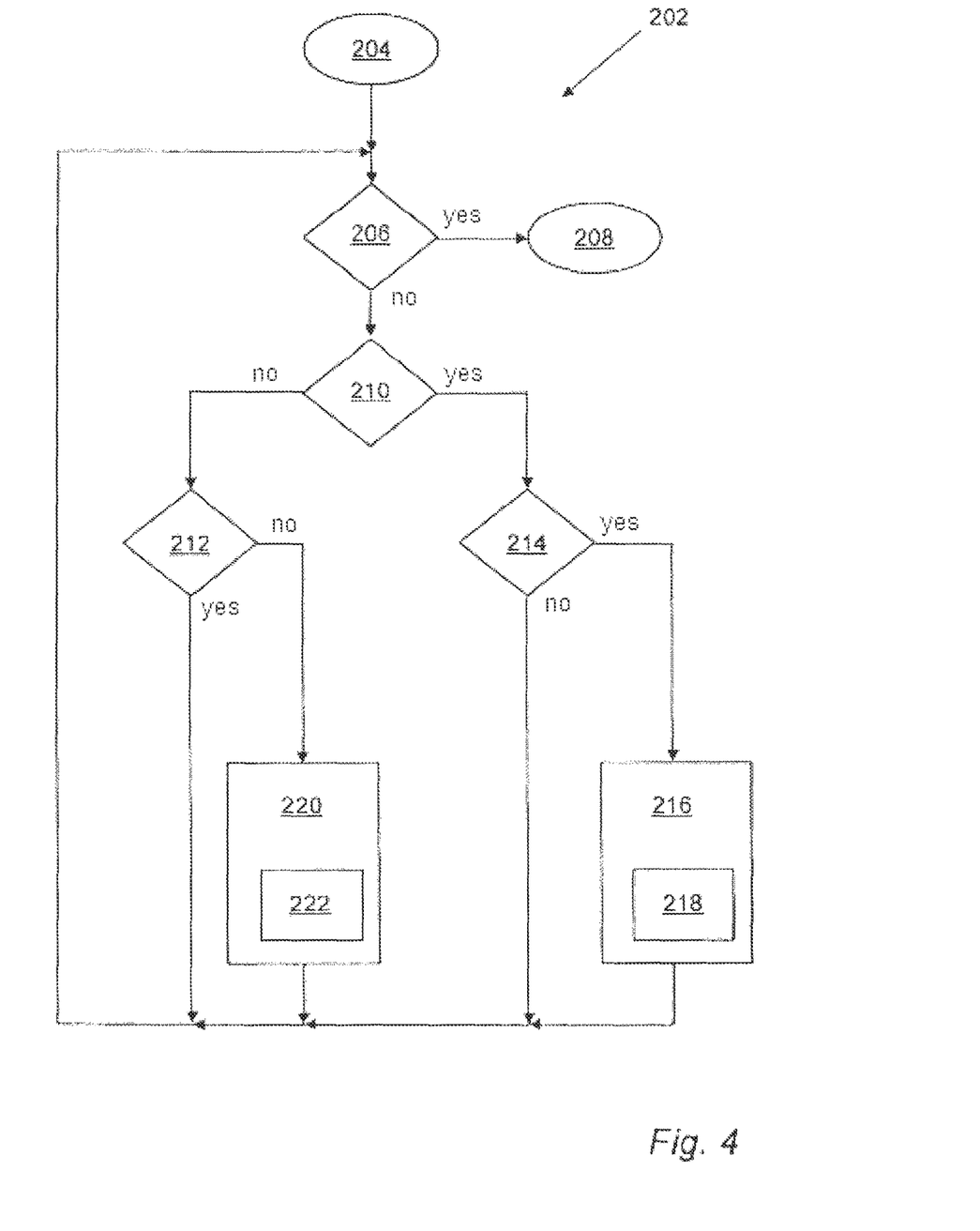
FIG. 4 shows steps in a braking method according to an exemplary embodiment of the invention, in particular, in a correspondingly expanded braking method of the exemplary embodiment according to FIG. 3 with the ignition switched off.

FIG. 4 is a block diagram illustrating method steps 202, with which the braking method of the embodiment example in FIG. 3 can be extended according to an exemplary embodiment of the invention. After the start 204 of the method, a query 206 establishes whether the ignition is switched on or activated. If this is the case, the method or the method steps 202 depicted is/are ended according to step 208. The method steps according to FIG. 3 can follow. Otherwise, a query 210 establishes whether the brake pedal 4 is actuated. In particular, a brake actuation is sensed, for example, by means of the electromechanical switch 110 or 112, wherein, due to the brake actuation, an electrical contact is closed that wakes up the wake-up electronics 114, in particular, a processor of the wake-up electronics 114. The query 210 should be regarded as a branch fork, given by the state of the switch 110 or 112, wherein, depending on the respective state (closed or open), the method proceeds either in branch "yes" or in branch "no".

According to an alternative embodiment in which the wake-up electronics 114 are permanently powered or consume electrical power, sensor data are supplied to the wake-up electronics 114, wherein the wake-up electronics 114 actively determines whether the brake pedal 4 is actuated.

As long as no brake actuation is sensed and the control device 20, indicated by query 212, is in rest state, the wake-up electronics 114 does not consume electrical power and is unpowered or sleeping, and the system proceeds with query 206.

If a brake actuation is sensed according to query 210, the wake-up electronics 114 consumes electrical power or is powered and, hence, is awoken. In particular, the wake-up electronics 114 is switched on by means of the switch 110 or 112.

If the control device 20 is still in the rest state, indicated by query 214, according to step 216, it is switched into the operating state by the wake-up electronics 114, or is woken up. Step 216 optionally contains step 218, according to which the pressure build-up is started in at least one hydraulic circuit 90, so that at least the brake servo 88 is functional, in particular, if the pressure it the hydraulic circuit 90 is built up by means of an electrically driven pump.

After waking, or when the operating state has been reached, query 214 is followed by query 206. If now, according to query 210, no brake actuation is sensed but the operating state of the control device 20, according to query 212 (with ignition switched oft), is still present, i.e., if the switch 110 or 112 (with ignition switched oft) is opened, in particular, after a run-on time, according to step 220, the control device 20 is switched back from the operating state into the rest state or sent to sleep, in particular, by means of the wake-up electronics 114. Preferably, also, the wake-up electronics 114 is sent to sleep. Step 220 optionally contains step 222 according to which the pressure build-up in the hydraulic circuit 90 is ended.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

The invention claimed is:

1. A braking method for a vehicle, comprising:
providing a hydraulic circuit in a power steering system of the vehicle that carries hydraulic fluid with a built-up hydraulic circuit pressure, the built-up hydraulic circuit pressure provided by a power steering pump;
generating, by a master brake cylinder upon mechanical actuation of an actuating valve, a service brake pressure in at least one service brake circuit to actuate a service brake, wherein the actuating valve is configured to provide, from the hydraulic circuit to the master brake cylinder, a portion of the hydraulic fluid with the built-up hydraulic circuit pressure; and
using a valve device disposed upstream of the master brake cylinder to effect, by using a portion of the hydraulic fluid with the built-up hydraulic circuit pressure, active output control of a master brake cylinder actuation pressure for hydraulic actuation of the master brake cylinder for an active braking intervention, wherein the valve device includes a first output control device configured to connect a hydraulic fluid pressure input to the actuating valve, wherein the first output control device is a 4/2-way solenoid valve that connects the hydraulic fluid pressure input to the actuating valve in a powered state.

2. The braking method, as claimed in claim 1, wherein using a valve device disposed upstream of the master brake cylinder to effect active output control of the master brake cylinder actuation pressure includes using an activation function to activate the active output control of the master brake cylinder actuation pressure in response to a driving state of the vehicle for which the necessity of an active braking intervention has been determined.

3. The braking method as claimed in claim 1, further comprising using a deactivation function to deactivate the active output control of the master brake cylinder actuation pressure in response to a brake pedal actuation force sensed by a force sensor to be above a limit value.

4. The braking method as claimed in claim 1, further comprising using a brake force servo to amplify a master brake cylinder actuation force applied to actuate the master brake cylinder by the hydraulic fluid provided via the hydraulic fluid pressure input with the hydraulic circuit pressure.

5. The braking method as claimed in claim 1, further comprising using wake-up electronics to switch a control device or parts of the control device controlling at least one of the service brake and the parking brake from a rest state into an operating state in response to a sensed brake actuation.

6. A braking device for a vehicle, comprising:
a hydraulic circuit in a power steering system of the vehicle that carries hydraulic fluid with a built-up hydraulic circuit pressure, the built-up hydraulic circuit pressure provided by a power steering pump;
a master brake cylinder configured to generate a service brake pressure in at least one service brake circuit to actuate a service brake;
an actuating valve mechanically actuatable by a brake pedal, the actuating valve configured to provide, from the hydraulic circuit to the master brake cylinder, a portion of the hydraulic fluid with the built-up hydraulic circuit pressure for mechanical actuation of the master brake cylinder; and
a valve device disposed upstream of the master brake cylinder, the valve device being configured to effect, using a portion of the hydraulic fluid with the built-up hydraulic circuit pressure, active output control of a master brake cylinder actuation pressure for hydraulic actuation of the master brake cylinder for an active braking intervention, the valve device including a first output control device configured to connect a hydraulic fluid pressure input to the actuating valve,
wherein the first output control device is a 4/2-way solenoid valve that connects the hydraulic fluid pressure input to the actuating valve in a powered state.

7. The braking device as claimed in claim 6, further comprising an activator configured to activate the active output control of the master brake cylinder actuation pressure in response to a driving state of the vehicle for which the necessity of an active braking intervention has been determined.

8. The braking device as claimed in claim 6, further comprising a deactivator configured to deactivate the active output control of the master brake cylinder actuation pressure in response to a brake pedal actuation force sensed by a force sensor to be above a limit value.

9. The braking device as claimed in claim 6, further comprising a brake servo configured to amplify a master brake cylinder actuation force applied to actuate the master brake cylinder by hydraulic fluid provided via the hydraulic fluid pressure input with the hydraulic circuit pressure.

10. The braking device as claimed in claim 6, further comprising wake-up electronics configured to switch, in response to a sensed brake actuation, a control device or parts of the control device controlling at least one of the service brake and the parking brake from a rest state to an operating state.

11. A braking device configured to effect the braking method as claimed in claim 1.

12. A hydraulic brake system for a vehicle, comprising a hydraulically actuatable service brake; and a braking device comprising:
a hydraulic circuit in a power steering system of the vehicle that carries hydraulic fluid with a built-up hydraulic circuit pressure, the built-up hydraulic circuit pressure provided by a power steering pump;
a master brake cylinder configured to generate a service brake pressure in at least one service brake circuit to actuate a service brake;
an actuating valve mechanically actuatable by a brake pedal, the actuating valve configured to provide, from the hydraulic circuit to the master brake cylinder, a portion of the hydraulic fluid with the built-up hydraulic circuit pressure for mechanical actuation of the master brake cylinder, and
a valve device disposed upstream of the master brake cylinder, the valve device being configured to effect, using a portion of the hydraulic fluid with the built-up hydraulic circuit pressure, active output control of a master brake cylinder actuation pressure for hydraulic actuation of the master brake cylinder for an active braking intervention, the valve device including a first output control device configured to connect a hydraulic fluid pressure input to the actuating valve,
wherein the first output control device is a 4/2-way solenoid valve that connects the hydraulic fluid pressure input to the actuating valve in a powered state.

13. A vehicle, comprising the braking device as claimed in claim 6.

14. A vehicle, comprising the hydraulic brake system as claimed in claim 12.

15. A vehicle, comprising the braking device as claimed in claim 11.

16. The hydraulic brake system for a vehicle of claim 12, further comprising a pressure limiting valve configured to reduce excess pressure from the connection between the hydraulic fluid pressure input and the first output control device.

* * * * *